United States Patent
Ikawa et al.

(10) Patent No.: US 10,386,266 B2
(45) Date of Patent: Aug. 20, 2019

(54) OPTICAL INSPECTION DEVICE HAVING A MIRROR FOR REFLECTING LIGHT RAYS, A METHOD OF PRODUCING A LENS USING THE OPTICAL INSPECTION DEVICE, AND AN OPTICAL INSPECTION METHOD USING THE OPTICAL INSPECTION DEVICE

(71) Applicant: Panasonic Intellectual Property Management Co., Ltd., Osaka (JP)

(72) Inventors: Yoshihiro Ikawa, Osaka (JP);
Hironobu Chiba, Hyogo (JP);
Yoshihiro Ueno, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/961,362

(22) Filed: Apr. 24, 2018

(65) Prior Publication Data
US 2018/0238769 A1   Aug. 23, 2018

Related U.S. Application Data

(63) Continuation of application No. PCT/JP2017/009129, filed on Mar. 8, 2017.

(30) Foreign Application Priority Data

Mar. 10, 2016  (JP) .................. 2016-046753

(51) Int. Cl.
*G01M 11/02*  (2006.01)

(52) U.S. Cl.
CPC ........ *G01M 11/0207* (2013.01); *G01M 11/02* (2013.01); *G01M 11/0292* (2013.01)

(58) Field of Classification Search
CPC .. G01B 11/25; G01B 11/2513; G01B 11/2545
See application file for complete search history.

(56) References Cited

U.S. PATENT DOCUMENTS

| 3,938,892 A * | 2/1976 | Klingman, III .... G01M 11/0292 356/124.5 |
| 5,767,962 A * | 6/1998 | Suzuki ................... G01N 21/94 356/237.2 |

(Continued)

FOREIGN PATENT DOCUMENTS

| JP | 9-061297 | 3/1997 |
| JP | 10-318883 | 12/1998 |

(Continued)

OTHER PUBLICATIONS

International Search Report of PCT application No. PCT/JP2017/009129 dated May 30, 2017.

(Continued)

*Primary Examiner* — Michael P LaPage
(74) *Attorney, Agent, or Firm* — Wenderoth, Lind & Ponack, L.L.P.

(57) ABSTRACT

An optical inspection device includes: an LED; a chart; a collimator; and a mirror. The LED irradiates the chart with light to deliver light rays to the collimator as on-axis light rays. This allows a pattern on the chart to be projected onto a center of an image sensor through the collimator and an optical system under inspection. The mirror reflects light rays delivered to the mirror through the collimator among the on-axis light rays. This allows the pattern on the chart to be projected onto a periphery of the image sensor through the optical system under inspection.

8 Claims, 8 Drawing Sheets

(56) References Cited

U.S. PATENT DOCUMENTS

| | | | | |
|---|---|---|---|---|
| 5,896,194 A | * | 4/1999 | Yanagi | G01M 11/0264 356/124 |
| 6,236,453 B1 | * | 5/2001 | Ikezawa | G01M 11/0235 356/124 |

FOREIGN PATENT DOCUMENTS

| | | | | |
|---|---|---|---|---|
| JP | 2004-184118 | | 7/2004 | |
| JP | 2007-093339 | | 4/2007 | |
| JP | 2008-256900 | | 10/2008 | |
| JP | 2012-078330 | | 4/2012 | |
| WO | 2006/028183 | | 3/2006 | |
| WO | WO-2017174791 A1 | * | 10/2017 | G01M 11/025 |

OTHER PUBLICATIONS

Extended European Search Report dated Apr. 9, 2019 in European Patent Application No. 17763285.8.
English Translation of Chinese Search Report dated May 28, 2019 for the related Chinese Patent Application No. 201780003987.4.

* cited by examiner

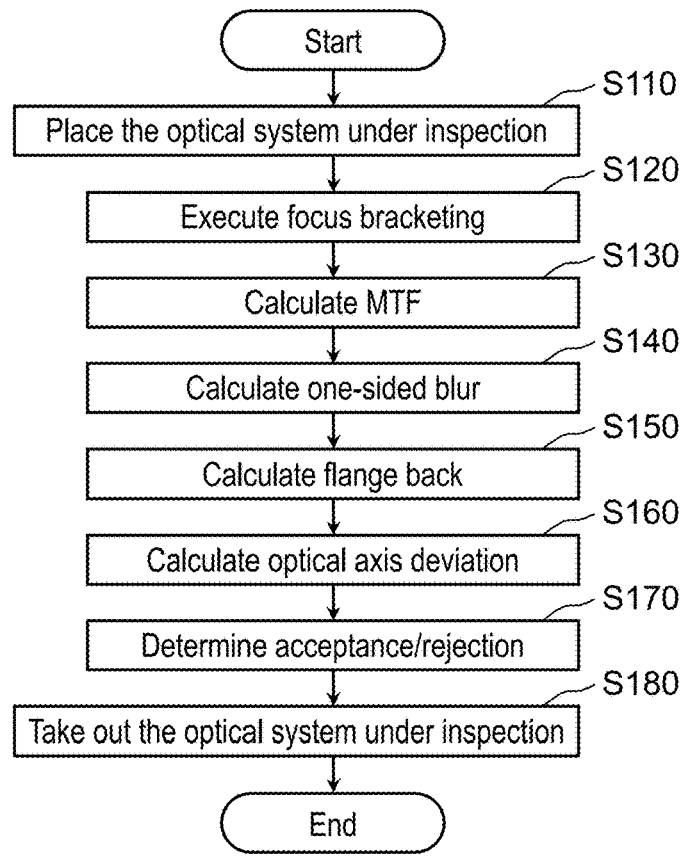
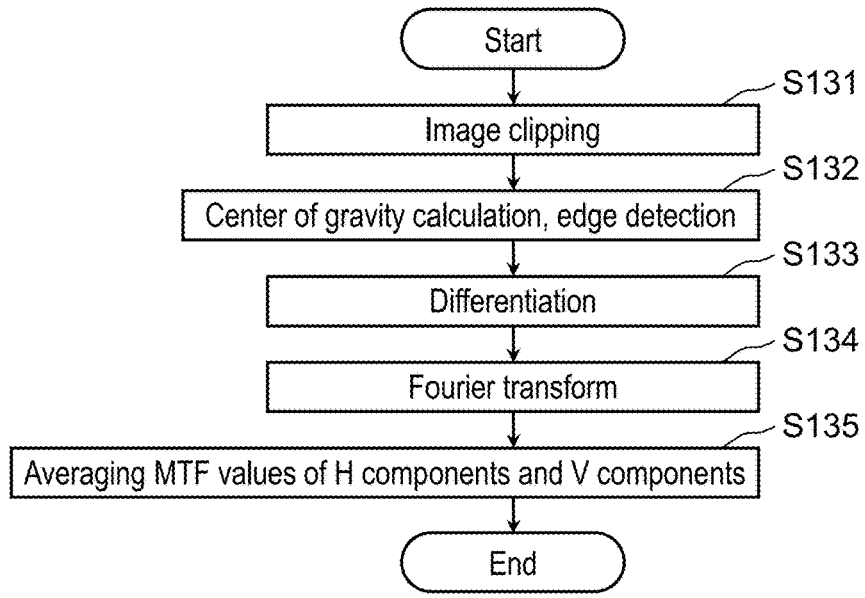

OPTICAL INSPECTION DEVICE HAVING A MIRROR FOR REFLECTING LIGHT RAYS, A METHOD OF PRODUCING A LENS USING THE OPTICAL INSPECTION DEVICE, AND AN OPTICAL INSPECTION METHOD USING THE OPTICAL INSPECTION DEVICE

TECHNICAL FIELD

The present disclosure relates to an optical inspection device for inspecting an optical performance of an optical system including at least one lens, to a lens produced through an inspection using the optical inspection device, and to an optical inspection method.

BACKGROUND ART

Such a conventional optical inspection device has been proposed that inspects an optical performance of a lens under inspection (see, for example, Unexamined Japanese Patent Publication No. 2004-184118). According to Unexamined Japanese Patent Publication No. 2004-184118, a measuring device, which is an optical inspection device, reflects a chart disposed on an optical axis of the lens under inspection by a mirror, and images the reflected chart by using the lens under inspection to perform a measurement. Then, the measuring device calculates, as an optical performance, a modulation transfer function (MTF) or the like of the lens under inspection based on the measured result.

However, the inventor found that the prior art disclosed in Unexamined Japanese Patent Publication No. 2004-184118 has a problem as described below. The optical inspection device (the measuring device) disclosed in Unexamined Japanese Patent Publication No. 2004-184118 projects the entire chart placed on the optical axis of the lens under inspection onto the CCD sensor by the lens under inspection. Further, this optical inspection device reflects the chart by a mirror, and projects the reflected chart onto the CCD sensor by the lens under inspection. Since the optical inspection system utilizes reflection by the mirror, it is possible to inspect off-axis modulation transfer function (MTF) or phase transfer function (PTF) of the lens under inspection. In other words, a wide-angle lens under inspection can be inspected by a small-size device. However, it is necessary to set a distance to the chart corresponding to an incident angle of light necessary for inspection of the lens under inspection. In other words, there is a problem that the distance to the chart is restricted.

Thus, the optical inspection device disclosed in Unexamined Japanese Patent Publication No. 2004-184118 has a problem in that the distance to the chart at the time of imaging the chart by using the lens under inspection is restricted.

SUMMARY OF THE INVENTION

Considering the above, the present disclosure is to provide an optical inspection device that can reduce the restriction of the distance to the chart.

An optical inspection device in one aspect of the present disclosure is an optical inspection device for inspecting an optical performance of an optical system under inspection including at least one lens. This optical inspection device comprises: a light emitter; a chart; a collimating lens; and a mirror. A pattern (shape) to be projected by the light emitter is drawn on the chart. The collimating lens is disposed between the chart and the optical system under inspection. The mirror is disposed between the collimating lens and the optical system under inspection. The light emitter irradiates the chart with light to deliver light rays to the collimating lens as on-axis light rays. The pattern (shape) on the chart is projected onto a center of an image sensor through the collimating lens and the optical system under inspection. The mirror reflects light rays delivered to the mirror through the collimating lens among the on-axis light rays. This allows the reflected light rays to be projected onto a periphery of the image sensor through the optical system under inspection.

These general or specific aspects may be implemented by a system, a method, an integrated circuit, a computer program or a computer-readable storage medium such as, for example, a CD-ROM, or may be implemented as an arbitrary combination of a system, a method, an integrated circuit, a computer program and a storage medium.

The optical inspection device of the present disclosure makes it possible to reduce the restriction of the distance to the chart.

BRIEF DESCRIPTION OF DRAWINGS

FIG. 9A is a flowchart illustrating an inspection method performed by the optical inspection device in accordance with the exemplary embodiment.

FIG. 9B is a flowchart illustrating in detail a process of calculating values of the MTF in step S130 shown in FIG. 9A.

DETAILED DESCRIPTION OF THE INVENTION

Figure 1:
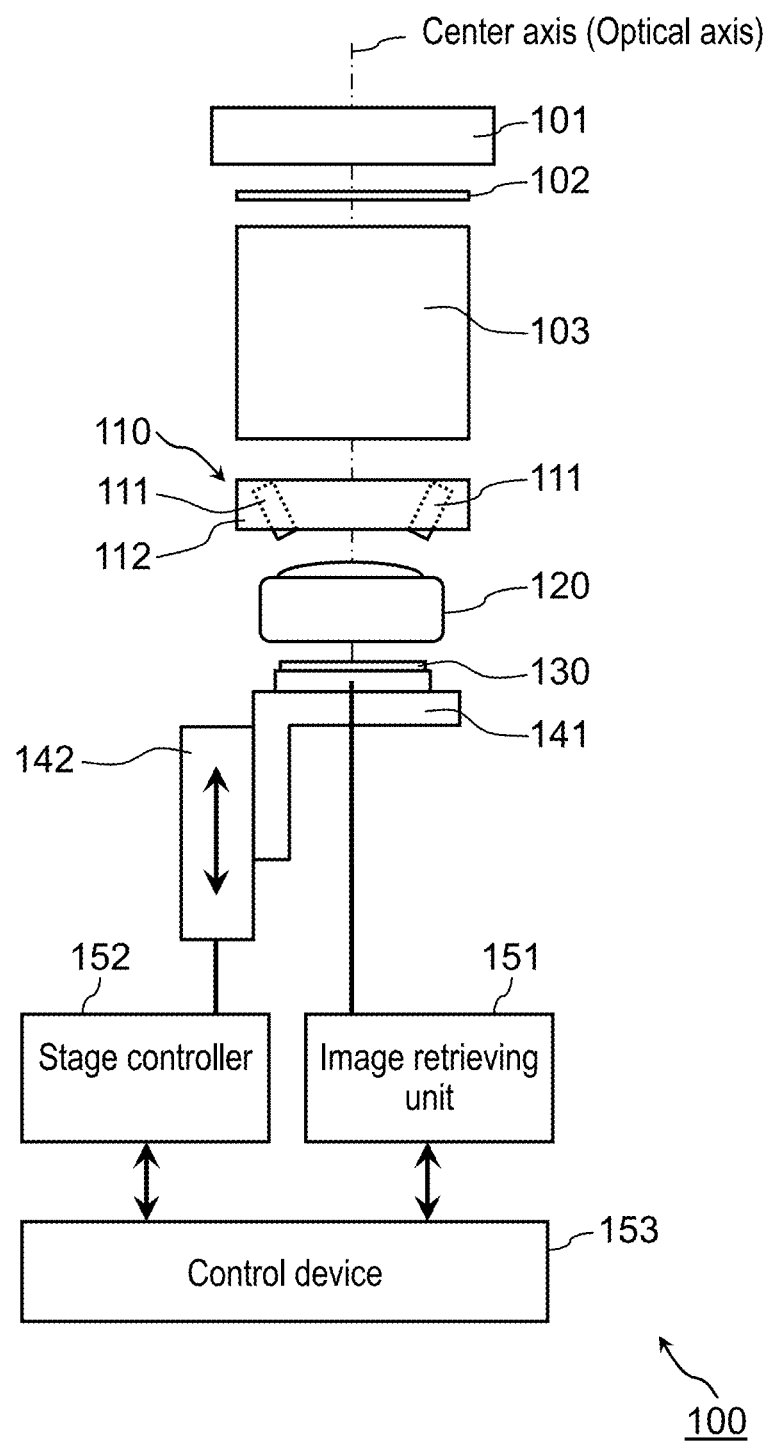
FIG. 1 is a diagram illustrating an entire configuration of an optical inspection device in accordance with an exemplary embodiment.

An optical inspection device in one aspect of the present disclosure is an optical inspection device for inspecting an optical performance of an optical system under inspection including at least one lens. This optical inspection device in one aspect of the present disclosure comprises: a light emitter; a chart; a collimating lens; and a mirror. A pattern (shape) to be projected by the light emitter is drawn on the chart. The collimating lens is disposed between the chart and the optical system under inspection. The mirror is disposed between the collimating lens and the optical system under inspection. The light emitter irradiates the chart with light to deliver light rays to the collimating lens as on-axis light rays. This allows the pattern on the chart to be projected onto a center of an image sensor through the collimating lens and the optical system under inspection. The mirror reflects light rays delivered to the mirror through the collimating lens among the on-axis light rays. This allows the reflected light rays to be projected onto a periphery of the image sensor through the optical system under inspection.

The light rays reflected by the mirror enter the optical system under inspection from a direction inclined with respect to the optical axis of the optical system under inspection. This allows the pattern (shape) of the chart to be projected onto the periphery of the image sensor as a virtual image. The light rays which are not reflected by the mirror enter the inspection optical system along the optical axis of the optical system under inspection. This allows the pattern of the chart to be projected onto the center of the image sensor. In other words, it is possible to simultaneously project the pattern of the chart onto both the periphery and the center of the image sensor. Accordingly, the effect equivalent to that obtained by projecting a pattern drawn on a large chart onto an image sensor at once through a wide-angle optical system under inspection can be realized by using a small chart, without using a large chart. This makes it possible to downsize the optical inspection device even in a case of inspecting a wide-angle optical system under inspection. Further, in a case of using a large chart, it is necessary to change an area of the pattern drawn on the chart to adjust the incident angle of the light rays entering the optical system under inspection. In other words, it is necessary to change the chart according to the kind of the optical system under inspection. On the other hand, in the optical inspection device in accordance with the present disclosure, the incident angle can be adjusted by changing the angle of the mirror, so that it is possible to use a unified chart for various kinds of inspected optical devices. As a result, it is possible to save the trouble of changing the chart.

Further, in the optical inspection device in one aspect of the present disclosure, light rays output from the collimating lens, or parallel light rays, are reflected by the mirror to be delivered to the optical system under inspection. Accordingly, it is possible to keep constant the direction of the light rays reflected by the mirror regardless of the distance between the chart and the collimating lens or the mirror. As a result, inspection of the optical system under inspection can be performed without restriction of the distance between the chart and the image sensor, even in a case, for example, where the distance to the chart is infinity. In other words, the restriction of the distance to the chart can be reduced.

Further, in the optical inspection device in one aspect of the present disclosure, not the peripheral light rays, but the on-axis light rays travelling along the center axis (i.e., the optical axis) of the collimating lens, are delivered to the collimating lens. This allows the light rays to be delivered to the center of the collimating lens, without being delivered to the periphery of the collimating lens. This make it possible to inspect the optical system under inspection without being affected by the distortion of the collimating lens. This makes it possible to improve the inspection accuracy of the optical system under inspection.

The optical inspection device may, for example, have a plurality of mirrors, and the plurality of mirrors may be arranged to be in rotationally symmetrical about an axis which is substantially the same as the center axis of the collimating lens, and to be inclined with respect to the center axis at an angle depending on inspection of the optical system under inspection.

This makes it possible to simultaneously inspect, as optical performances of the optical system under inspection, a resolution such as, for example, a modulation transfer function on the optical axis and at the periphery of the optical system under inspection, a one-sided blur, an optical axis deviation, and a flange back.

Further, the optical system under inspection may be disposed so that the optical axis of the optical system under inspection coincides with the center axis of the collimating lens, and, in a case where the incident angle of light rays necessary for inspecting the optical system under inspection is $\theta$, the mirror may be inclined at $\theta/2$ with respect to the center axis.

This allows the light rays reflected by the mirror to enter the optical system under inspection at an incident angle of light necessary for inspecting the optical system under inspection, so that it is possible to properly inspect the optical performances of the optical system under inspection.

Further, the pattern (shape) of the chart may be substantially circular, and an area around the pattern on the chart may be black.

Since the pattern is substantially circular, each of a plurality of images projected onto the image sensor (an image of the pattern and a plurality of virtual images of the pattern) becomes substantially circular. Accordingly, it is possible to prevent each of the plurality of images projected onto the image sensor from being seen inclined depending on the arrangement of the mirror, so that the images can be made to have a uniform pattern. Further, since the edge shapes of the plurality of images projected on the image sensor become arcs, it is possible to suppress the influence of variations in the cell pitch of the image sensor on detecting the edges. In a case of detecting the edges in the horizontal direction, for example, the influence of the variations in cell pitches of the image sensor can be suppressed by carrying out detection of an edge in the horizontal direction plural times while shifting the detection position in the vertical direction, and averaging the detection results.

Also, since the area around the pattern on the chart is black, it is possible to suppress unnecessary light rays such as, for example, those reflected within the lens barrel holding the collimating lens. As a result, it is possible to improve the inspection accuracy of the optical performances of the optical system under inspection.

Also, the optical inspection device may further have a stage that is movable along the center axis of the collimating lens, and the image sensor may be disposed on the stage.

This makes it possible to easily perform focus bracketing, and use its imaged result to rapidly perform inspection of the optical performances of the optical system under inspection. In other words, the optical inspection device in accordance with the present disclosure has a stage that is movable along the center axis of the collimating lens, and the image sensor is disposed on the stage. This makes it possible to move the image sensor at specified intervals within a specified range including forward and backward positions from the focus position in the optical axis direction. As a result, it is possible to easily image the chart at the respective focus positions. In other words, it is possible to easily perform the operation of imaging the chart while changing the focus position. In the present disclosure, this operation of imaging the chart while changing the focus position is called the focus bracketing.

Also, the optical inspection device may have a stage that is movable along the center axis of the collimating lens, and the chart may be disposed on the stage.

This makes it possible to easily perform the focus bracketing, and use its imaged result to rapidly perform inspection of the optical performances of the optical system under inspection. Further, since the chart fixed to the stage moves, it is possible to perform the focus bracketing even in a case where the inspected optical device and the image sensor are fixed to each other. In other words, even in a case of inspecting a lens barrel in which the optical system under inspection is fixed to the image sensor (the so-called final product), it is possible to properly inspect the optical system under inspection.

Also, a lens in another aspect of the present disclosure is a lens which is an optical system under inspection that is produced through inspection by the above-described optical inspection device.

Since this lens has been inspected by the above-described optical inspection device, its optical performances can be assured.

These general or specific aspects may be implemented by a system, a method, an integrated circuit, a computer program or a computer-readable storage medium such as, for example, a CD-ROM, or may be implemented as an arbitrary combination of a system, a method, an integrated circuit, a computer program and a storage medium.

Hereinafter, an exemplary embodiment will be specifically described with reference to the drawings.

It should be noted that each of the following exemplary embodiments shows merely a general or specific example. Each of the numeric values, shapes, materials, components, disposed positions and connection manners of the components, steps, order of the steps, and the like is an example, and is not intended to limit the present disclosure. Also, among the components included in the following exemplary embodiment, such components that are not included in an independent claim defining the most generic concept of the present disclosure will be explained as in-essential, arbitrary components.

Further, each figure illustrates a schematic diagram, which is not necessarily drawn accurately. Also, like components are indicated by like reference marks in each figure.

Exemplary Embodiment

FIG. 1 is a diagram illustrating an entire configuration of an optical inspection device in accordance with the present exemplary embodiment.

Optical inspection device 100 in accordance with the present exemplary embodiment is a device for inspecting optical system 120 under inspection, and comprises: light emitting diode (LED) 101, which is a light emitter; chart 102; collimator 103; reflection unit 110; image sensor 130; stage 141; stage driving mechanism 142; image retrieving unit 151; stage controller 152; and control device 153.

Optical system 120 under inspection comprises at least one lens, and a lens barrel that holds the lens. Such optical system 120 under inspection is disposed between reflection unit 110 and image sensor 130 in optical inspection device 100.

LED 101 emits light to irradiate chart 102.

Chart 102 is made, for example, into a sheet form on which a pattern (shape) to be projected by LED 101 is drawn. In other words, the pattern (shape) on the chart has a high transmittance, and the remaining part other than the pattern on chart 102 has a low transmittance. Details of the pattern will be described later.

Collimator 103 comprises a least one collimating lens, and a lens barrel that holds the collimating lens. Such collimator 103 converts incident light rays from the side facing chart 102 to parallel light rays, and outputs the parallel light rays from the side opposite to chart 102. The lens barrel of collimator 103 may have an inner diameter of, for example, 25 mm. The center axis of collimator 103 is the same as the optical axis of the collimating lens.

Reflection unit 110 comprises a plurality of (e.g., four) mirrors 111, and mirror holder 112 that holds these mirrors 111. These mirrors 111 reflect parallel light rays entering mirrors 111, among the parallel light rays output from collimator 103, toward optical system 120 under inspection.

Image sensor 130, which may be a charge coupled device (CCD) image sensor or a complementary metal oxide semiconductor (CMOS) image sensor, receives first light rays and second light rays. The first light rays are light rays that enter optical system 120 under inspection from collimator 103 without being reflected by mirror 111, and are output from optical system 120 under inspection. In other words, the first light rays are light rays along the optical axis of optical system 120 under inspection. The second light rays are light rays that are output from collimator 103, reflected by mirror 111 to enter optical system 120 under inspection, and output from optical system 120 under inspection. In other words, the second light rays are light rays along a direction that is inclined with respect to the optical axis.

Image sensor 130 simultaneously receives the above-described first light rays and second light rays. Specifically, image sensor 130 images the pattern (shape) of chart 102 by receiving the first light rays. Image sensor 130 also images virtual images of the pattern of chart 102, or patterns of chart 102 reflected on mirrors 111, by receiving the second light rays. In this manner, image sensor 130 simultaneously images the pattern of chart 102 projected by LED 101, and a plurality of virtual images of the pattern.

The pattern (shape) of chart 102, collimator 103, reflection unit 110, optical system 120 under inspection, and image sensor 130 are arranged along the optical axis of optical system 120 under inspection so that their center axes coincide with the optical axis of optical system 120 under inspection.

Stage 141 is a stage that is movable along the center axis of collimator 103 and supports image sensor 130. Image sensor 130 is disposed on stage 141 so that its light receiving surface is on a side facing reflection unit 110 and collimator 103.

Stage driving mechanism 142 has a motor, for example, and rotates the rotational shaft of the motor according to a drive signal from stage controller 152. This operation of stage driving mechanism 142 allows stage 141 to move along the optical axis of optical system 120 under inspection. In other words, in a case where the direction of the optical axis is in the vertical direction, stage driving mechanism 142 moves stage 141 upward or downward in the vertical direction.

Stage controller 152 produces the drive signal for controlling stage controller 142 according a control signal from control device 153, and outputs the drive signal to stage controller 142.

Image retrieving unit 151 retrieves an image signal from image sensor 130, and outputs the image signal to control device 153. This image signal indicates a captured image, which includes an image of the pattern (shape) of chart 102 and images of virtual images of the pattern, taken by image sensor 130.

Control device 153 may, for example, be a personal computer. Control device 153 outputs the above-mentioned control signal to stage controller 152 in response to an operation by a user. Also, control device 153 obtains the image signal output from image retrieving unit 151. Control device 153 uses the obtained image signal to perform an inspection process to identify the optical performances of optical system 120 under inspection.

Figure 2A:
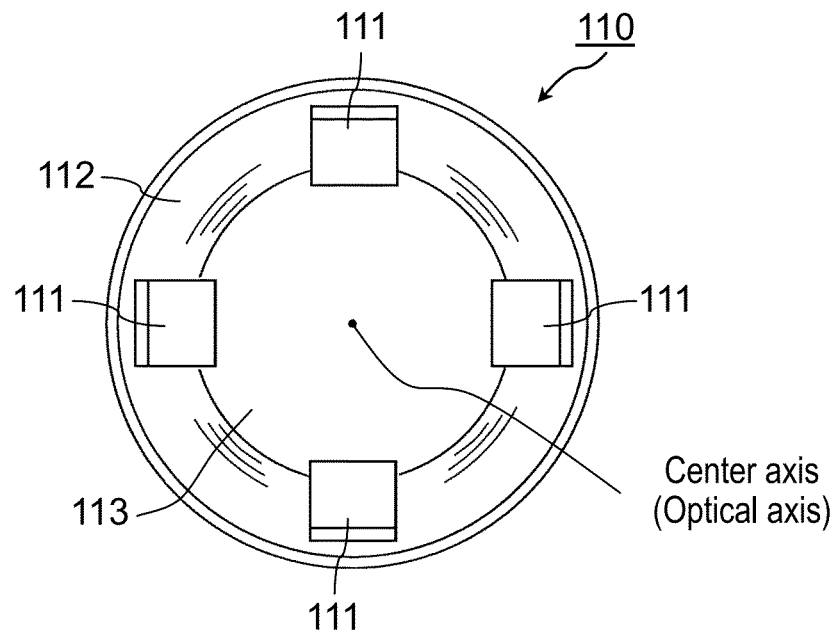
FIG. 2A is a top view of a reflection unit in accordance with the exemplary embodiment.
Figure 2B:
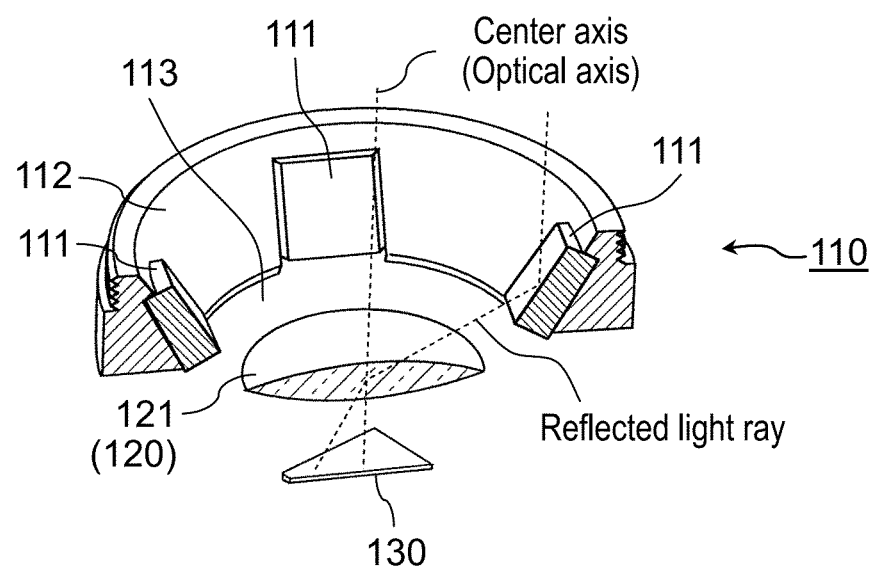
FIG. 2B is a cross-sectional perspective view of the reflection unit in accordance with the exemplary embodiment.

FIG. 2A is a top view of reflection unit 110. FIG. 2B is a cross-sectional perspective view of reflection unit 110. Specifically, FIG. 2A is an external view of reflection unit 110 viewed from the side facing collimator 103 in optical inspection device 100 shown in FIG. 1. Also, FIG. 2B shows a positional relation between reflection unit 110 and each of optical system 120 under inspection and image sensor 130.

Mirror holder 112 of reflection unit 110 is formed into substantially a ring shape, and holds four mirrors 111 on its inner side. These four mirrors 11 are arranged to be rotationally symmetrical about the center axis of collimator 103, and are each inclined with respect to the optical axis of optical system 120 under inspection at an angle depending on inspection of optical system 120 under inspection. Here, the axis of the rotational symmetry may not be limited to the center axis of collimator 103. The axis of the rotational symmetry may be an axis deviated within a range that may be regarded as substantially the center axis, or an axis which is substantially the same as the center axis of collimator 103.

Here, the light rays delivered from collimator 103 to reflection unit 110 are parallel light rays. Among the parallel light rays, the light rays on and near the center axis of collimator 103 pass through hollow 113 of mirror holder 112 of reflection unit 110 and are delivered to lens 121 under inspection included in optical system 120 under inspection. On the other hand, the light rays delivered to mirrors 111 among the parallel light rays are reflected by mirrors 111 toward lens 121 under inspection.

Figure 3:
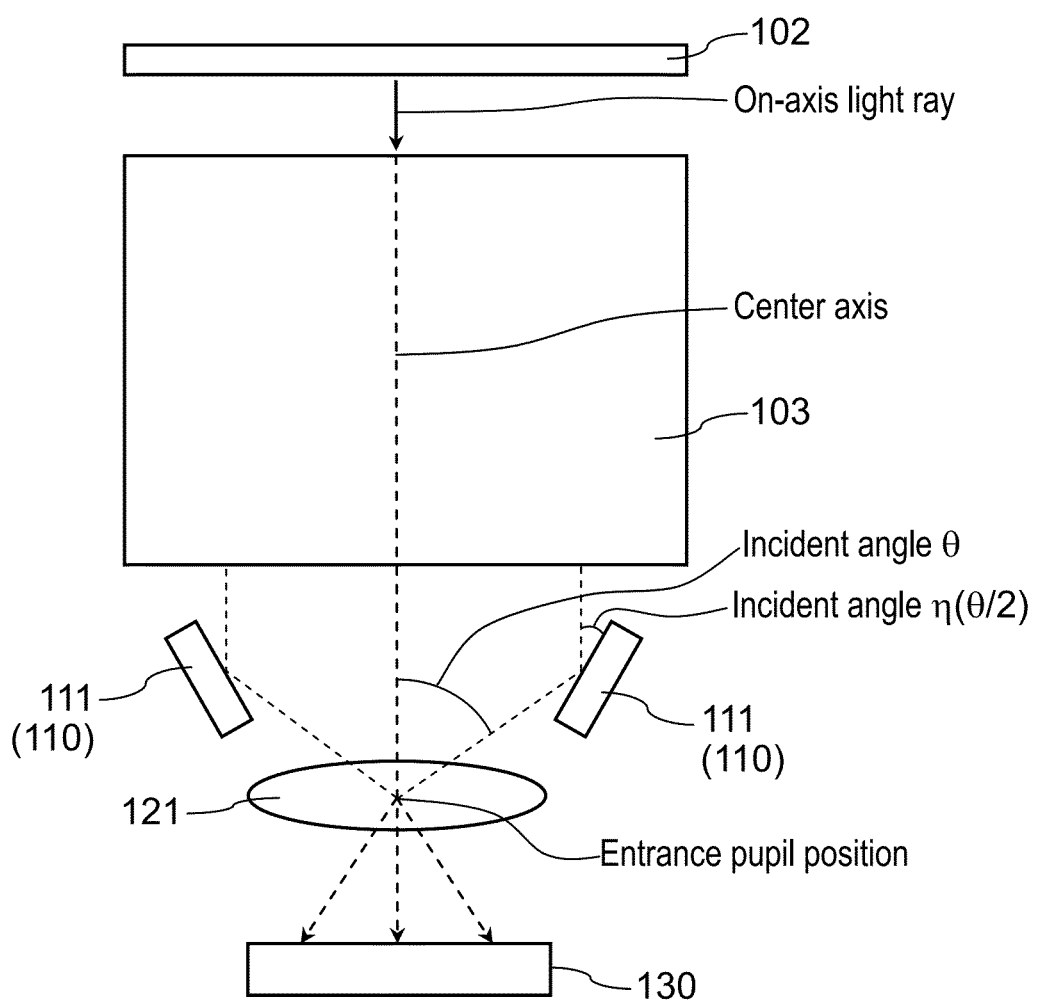
FIG. 3 is a diagram illustrating an inclination angle of a mirror in accordance with the exemplary embodiment.

FIG. 3 is a diagram illustrating an inclination angle of mirrors 111.

In the present exemplary embodiment, irradiation of chart 102 with light rays emitted from LED 101 causes on-axis light rays that are delivered from chart 102 to collimator 103. The on-axis light rays, which are light rays along the center axis (i.e., the optical axis) of collimator 103, enter collimator 103, and are output as parallel light rays from the side facing reflection unit 110. Here, each of mirrors 111 of reflection unit 110 is inclined with respect to the center axis of collimator 103. Specifically, each mirror 111 is inclined such that one end of mirror 111 on the side closer to lens 121 under inspection is closer to the center axis of collimator 103, and the other end of mirror 111 on the side closer to chart 102 is farther from the center axis of collimator 103.

More specifically, in a case of inspecting the optical performances of lens 121 under inspection for light rays which are incident on lens 121 under inspection at incident angle θ, the inclination angle of mirror 111 with respect to the center axis of mirror 111 is θ/2. In other words, incident angle η at which the parallel light rays output from collimator 103 are incident on mirror 111 is equal to θ/2.

In this manner, optical inspection device 100 in accordance with the present disclosure has four mirrors 111 which are inclined with respect to the center axis of collimator 103 at an angle depending on inspection of optical system 120 under inspection. This makes it possible to simultaneously inspect the optical performances on the optical axis and at the periphery of optical system 120 under inspection. The optical performances of optical system 120 under inspection include, for example, a resolution such as a modulation transfer function or the like, a one-sided blur, an optical axis deviation, and a flange back. Further, optical system 120 under inspection is disposed in the optical inspection device 120 so that the optical axis of optical system 120 under inspection coincides with the center axis of collimator 103. In a case where the incident angle of light necessary for inspection of optical system 120 under inspection is θ, mirrors 111 are inclined at θ/2 with respect to the center axis of optical-system-under-inspection. This allows the light rays reflected from mirrors 111 to be incident on optical system 120 under inspection at incident angle θ of light necessary for inspection of optical system 120 under inspection, so that it is possible to properly inspect the optical performances of optical system 120 under inspection at incident angle θ.

Figure 4:
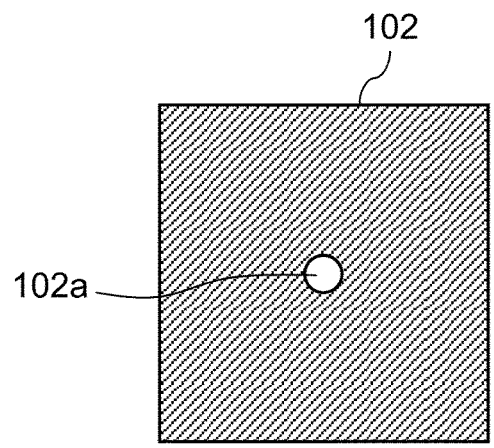
FIG. 4 is a diagram illustrating a chart in accordance with the exemplary embodiment.

FIG. 4 is a diagram illustrating chart 102 in accordance with the exemplary embodiment.

At the center of chart 102, substantially circular pattern 102a which is to be projected by LED 101 is drawn. All the area outside of pattern 102a is black.

The diameter of substantially circular pattern 102a of chart 102 may be set depending on the horizontal angle of view of optical system 120 under inspection or the inner diameter of the lens barrel of collimator 103. The horizontal angle of view is an area which can be imaged in the horizontal direction of a screen. For example, in a case where the horizontal angle of view of optical system 120 under inspection is 160°, in which the above-mentioned incident angle θ is 61.9°, it is preferable that the diameter of pattern 102a is 3 mm, which corresponds to 5% of the horizontal angle of view (i.e., 8°). In a case where the horizontal angle of view of optical system 120 under inspection is 59.10, in which the above-mentioned incident angle θ is 22.4°, it is preferable that the diameter of pattern 102a is 0.8 mm, which corresponds to 3% of the horizontal angle of view (i.e., about 2°). Also, it is preferable that the diameter of pattern 102a is equal to or smaller than ⅓ the inner diameter of the lens barrel of collimator 103. Specifically, in a case where the inner diameter of the lens barrel of collimator 103 is about 25 mm, the diameter of substantially circular pattern 102a of chart 102 is made 3 mm as described above to be limited to 12% of the lens barrel's inner diameter of collimator 103. Also, in this case, the diameter of substantially circular pattern 102a of chart 102 is made 0.8 mm as described above to be limited to 3.2% of the lens barrel's inner diameter of collimator 103.

With this configuration, according to the present exemplary embodiment, light rays can be delivered to collimator 103 as on-axis light rays, but not as peripheral light rays. In other words, by limiting the diameter of pattern 102a of chart 102, the light rays emitted from LED 101 and transmitted through chart 102 can be regarded as on-axis light rays.

Figure 5:
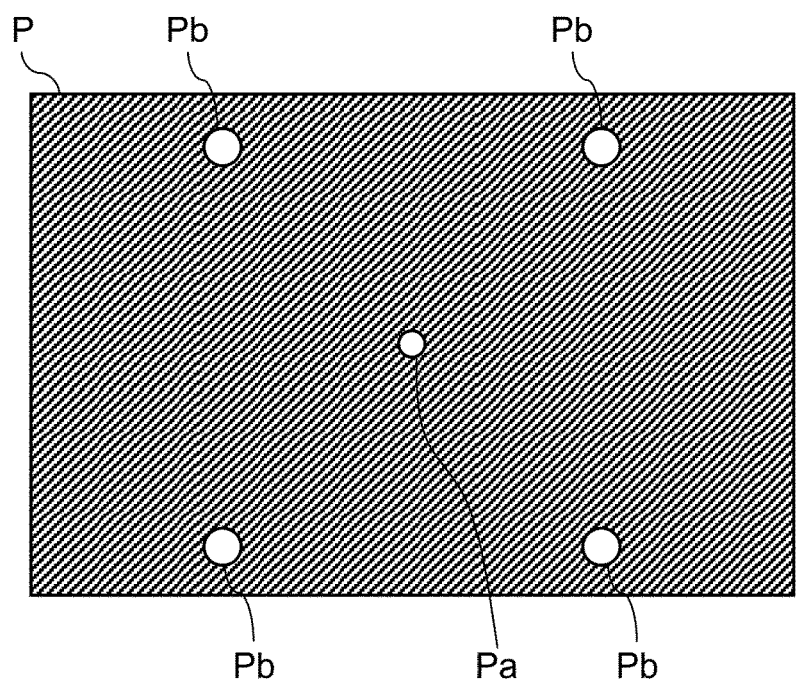
FIG. 5 is a diagram illustrating a captured image in accordance with the exemplary embodiment.

FIG. 5 is a diagram illustrating an image taken by imaging with image sensor 130.

Substantially circular image Pa appears at the center of captured image P, which is an image taken by image sensor 130. Also, substantially circular images Pb appear at four locations in the periphery of captured image P. Image Pa is an image of pattern 102a of chart 102 projected onto image sensor 130 through collimator 103 and optical system 120 under inspection. In other words, image Pa is an image of pattern 102a projected without being passed through mirrors 111. Image Pb at the peripheral four locations are images of pattern 102a of chart 102 reflected by mirrors 111 and projected onto image sensor 130, or virtual images of pattern 102a. Assuming that the distance from the center to a corner of the image is 1, each of images Pb at the peripheral four locations appears at a distance, for example, of 0.6 from the center.

Like this, according to the present exemplary embodiment, since pattern 102a is substantially circular, each of images Pa and Pb projected onto image sensor 130 (an image of the pattern and the plurality of virtual images of the pattern) becomes substantially circular. Accordingly, it is possible to prevent each of images Pa and Pb projected onto image sensor 130 from being seen inclined depending on the arrangement of mirrors 111. This allows each of image Pa and images Pb to become a uniform pattern. Also, since the area around pattern 102a on chart 102 is black, it is possible to suppress undesired light that obstructs the inspection of the optical performances of optical system 120 under inspection. For example, it is possible to suppress undesired light that reflects inside the lens barrel of collimator 103. As a result, it is possible to improve the inspection accuracy of the optical performances of optical system 120 under inspection.

FIG. 6 to FIG. 9B are diagrams for explaining an inspection process for inspecting the optical performances of optical system 120 under inspection by using captured image P taken by image sensor 130.

Figure 6:
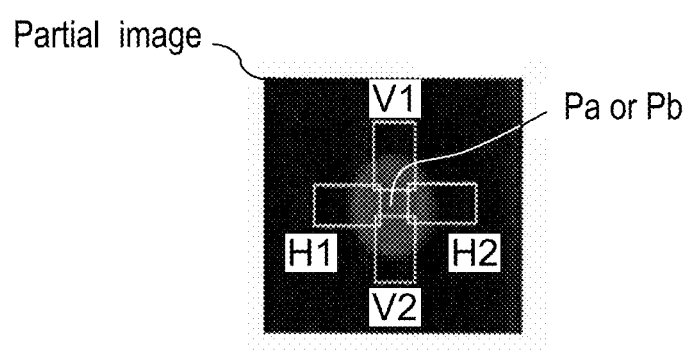
FIG. 6 is a diagram illustrating a partial image of the captured image in accordance with the exemplary embodiment.

FIG. 6 is a diagram illustrating a partial image of captured image P.

Control device 153, at the time of performing an inspection process, identifies a partial image that includes image Pa and a partial image that includes image Pb, which are partial images of captured image P taken by image sensor 130. Then, control device 153 identifies four regions H1, H2, V1 and V2 in each of the partial images. Regions H1 and H2 are regions which include edges in the horizontal direction (i.e., a first direction) of image Pa and image Pb, respectively. Regions V1 and V2 are regions which include edges in the vertical direction (i.e., a second direction perpendicular to the first direction) of image Pa and image Pb, respectively. Control device 153 analyzes the respective edges in four regions H1, H2, V1 and V2 to calculate the MTF, the one-sided blur and the optical axis deviation.

Figure 7:
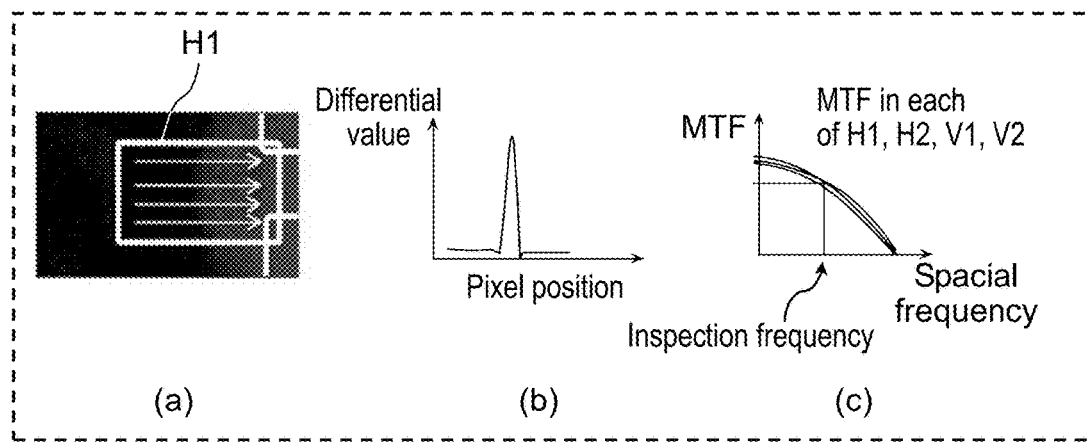
FIG. 7 is a diagram for explaining an analysis of the MTF by a control device in accordance with the exemplary embodiment.

FIG. 7 is a diagram for explaining calculation of the MTF by control device 153.

As shown in (a) and (b) in FIG. 7, control device 153 calculates, for each pixel position, a differential value, which is a rate of the change amount of the pixel value to the change amount of the pixel position, along a horizontal line included, for example, in region H1. This differential value indicates the intensity of the edge of image Pa or image Pb. In other words, an edge of image Pa or image Pb can be detected by calculating the above-described differential values. Also, control device 153 carries out the calculation of the differential values for each of a plurality of horizontal lines included in region H1.

Further, control device 153 carries out frequency analysis (e.g., Fourier transform) for the waveform of the differential values shown in (b) in FIG. 7 to produce a data indicating a relation between the spatial frequency and the value of the MTF as shown in (c) in FIG. 7. The values of the MTF indicated by this data are average values of the MTF values obtained for each of the above-mentioned horizontal lines. Control device 153 similarly carries out production of such data for regions H2, V1 and V2, in addition to region H1.

Further, based on the data, control device 153 identifies a value of the MTF corresponding to a predetermined inspection frequency in each of regions H1, H2, V1 and V2.

Here in the present exemplary embodiment, since pattern 102a of chart 102 is substantially circular, the shapes of the edges of images Pa and Pb projected onto image sensor 130 become arcs. Accordingly, it is possible to suppress the influence of the variations in the cell pitch of image sensor 130 during the edge detection. In other words, in the case of the above-described edge detection on a plurality of horizontal lines, edges at positions shifted in the horizontal direction are detected, because the shapes of edges of images Pa and Pb are arc. Then, an average value of such edge detection results (an average value of the MTF values) is calculated. Accordingly, it is possible to suppress the influence of the variations in the cell pitch of image sensor 130.

Figure 8:
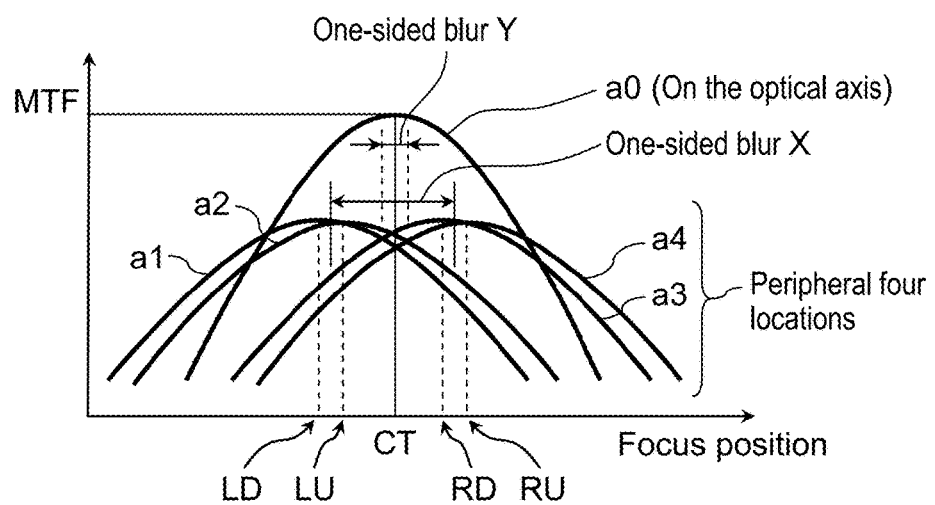
FIG. 8 is a diagram illustrating a relation between focus positions and MTF values in accordance with the exemplary embodiment.

FIG. 8 is a diagram illustrating a relation between the focus position and the MTF value.

Control device 153 instructs image retrieving unit 151 to repeatedly retrieve captured images P, while instructing stage controller 152 to move stage 141 along the optical axis. In other words, control device 153 carries out focus bracketing by controlling stage controller 152 and image retrieving unit 151. This makes it possible to obtain a plurality of captured images P which are different in focus point from one another.

Control device 153 performs the process shown in FIG. 6 and FIG. 7 for these captured images P to identify, as shown in FIG. 8, a value of the MTF at each focus point, or an MTF value corresponding to the inspection frequency. Referring to FIG. 8, curve a0 indicates the MTF values corresponding to image Pa on the optical axis. Curve a1 indicates the MTF value corresponding to image Pb at lower left in captured image P. Curve a2 indicates the MTF value corresponding to image Pb at upper left in captured image P. Curve a3 indicates the MTF value corresponding to image Pb at lower right in captured image P. Curve a4 indicates the MTF value corresponding to image Pb at upper right in captured image P.

Control device 153 calculates focus position CT at which the MTF value becomes maximum on curve a0, or in image Pa on the optical axis, as a flange back (i.e., the focal length) at incident angle=0° of optical system 120 under inspection. Also, control device 153 calculates focus position LD at which the MTF value becomes maximum on curve a1, or in image Pb at lower left, as a focus position at incident angle=θ at lower left of optical system 120 under inspection. Similarly, control device 153 calculates focus positions LU, RD and RU at which the MTF values become maximum on curves a2, a3 and a4, respectively, as focus positions at incident angle=θ at upper left, lower right and upper right, respectively, of optical system 120 under inspection.

Further, control device 153 calculates a difference between an average value of focus positions LD and LU and an average vale of focus positions RD and RU as one-sided blur X of optical system 120 under inspection. Similarly, control device 153 calculates a difference between an average value of focus positions RU and LU and an average vale of focus positions RD and LD as one-sided blur Y of optical system 120 under inspection.

FIG. 9A is a flowchart illustrating an inspection method performed by optical inspection device 100 in accordance with the present exemplary embodiment.

First, optical system 120 under inspection is placed in optical inspection device 100 (step S110). Then, control device 153 instructs image retrieving unit 151 to repeatedly carry out retrieval of captured images P, while outputting a control signal to stage controller 152 to move stage 141 along the optical axis. This allows focus bracketing to be performed (step S120). Then, control device 153 calculates values of the MTF based on a plurality of captured images P obtained by the focus bracketing (step S130). Next, control device 153 calculates the one-sided blurs based on captured images P (step S140). Further, control device 153 calculates the flange back based on captured images P (step S150). Further, control device 153 calculates the optical axis deviation of optical system 120 under inspection (step S160). As described above, the MTF values, the one-sided blurs, the flange back and the optical axis deviation, which are the optical performances of optical system 120 under inspection, are calculated. Then, based on the optical performances calculated as described above, control device 153 determines acceptance/rejection of optical system 120 under inspection (step S170). After this determination, optical system 120 under inspection is taken out of optical inspection device 100 (step S180)

FIG. 9B is a flowchart illustrating in detail a process of calculating the MTF values in step S130 shown in FIG. 9A.

First, control device 153 clips a partial image in captured image P (step S131). Then, control device 153 calculates a center of gravity of image Pa or image Pb included in the partial image. Further, control device 153 carries out an edge detection (step S132). In this edge detection, control device 153 identifies regions H1, H2, V1 and V2 which are respectively disposed on the left, right, upper and lower sides of the calculated center of gravity as a center, as shown in FIG. 6. Then, control device 153 reads out pixel values of a plurality of pixels arranged in the horizontal direction or the vertical direction in each of these regions, as shown in (a) in FIG. 7 (step S132).

Next, control device 153 carries out differentiation of the read-out pixel values to calculate a differential value at each pixel position, as shown in (b) in FIG. 7 (step S133). Further, control device 153 executes Fourier transform to produce data indicating the relation between the spatial frequency and the MTF values as shown in (c) in FIG. 7 (step S134).

Next, control device 153 calculates an average of the MTF values of the horizontal components (H components) based on the produced data in region H1 and region H2. Similarly, control device 153 calculates an average of the MTF values of the vertical components (V components) based on the produced data in region V1 and region V2 (step S135).

Advantageous Effects, Etc

As described above, optical inspection device 100 in accordance with the present exemplary embodiment is a device for inspecting optical system 120 under inspection which includes at least one lens. Optical inspection device 100 comprises: LED 101; chart 102; collimator 103; and mirrors 111. LED 101 is a light emitter. Pattern 102a which is to be projected by LED 101 is drawn on chart 102. Collimator 103 is disposed between chart 102 and optical system 120 under inspection. Mirrors 111 are disposed between collimator 103 and optical system 120 under inspection. LED 101 irradiates chart 102 with light rays to deliver the light rays to collimator 103 as on-axis light rays. The light rays project pattern 102a of chart 102 on the center of image sensor 130 through collimator 103 and optical system 120 under inspection. Mirrors 111 reflect light rays delivered through collimator 103 to mirrors 111 among the on-axis light rays. The reflected light rays are projected on the periphery of image sensor 130 through optical system 120 under inspection.

The light rays reflected by each mirror 111 enter optical system 120 under inspection from a direction inclined with respect to the optical axis of optical system 120 under inspection. This causes pattern 102a of chart 102 to be projected on the periphery of image sensor 130 as virtual images. The light rays which are not reflected by mirrors 111 enter optical system 120 under inspection along the optical axis of optical system 120 under inspection. This causes pattern 102a of chart 102 to be projected on the center of image sensor 130. Accordingly, image sensor 130 can simultaneously obtain both the light rays projected from the direction inclined with respect to the optical axis of optical system 120 under inspection and the light rays projected along the optical axis. This makes it possible to use small chart 102, without using a large chart, to realize the same effect as that obtained by simultaneously projecting a pattern drawn in a wide area on a large chart onto an image sensor through a wide-angle optical system under inspection. This makes it possible to down-size optical inspection device 100 even in a case of inspecting wide-angle optical system 120 under inspection. Further, in a case of using a large chart, it is necessary to change the area of the pattern drawn on the chart depending on the kind of the optical system under inspection to adjust the incident angle of light with respect to the optical system under inspection. In other words, it is necessary to change the chart depending on the kind of the optical system under inspection. In optical inspection device 100 in accordance with the present exemplary embodiment, however, the incident angle can be adjusted by changing the angle of each mirror 111, so that it is possible to make chart 102 uniform for various kinds of optical systems-under-inspection 120. As a result, it is possible to save the trouble of changing chart 102.

Further, in optical inspection device 100 in accordance with the present exemplary embodiment, the light rays output from collimator 103, or the parallel light rays, are reflected by mirrors 111 and delivered to optical system 120 under inspection. Accordingly, it is possible to keep constant the direction of light rays reflected by mirrors 111 regardless of the distance between chart 102 and collimator 103 or mirrors 111. As a result, inspection can be performed without restriction of the distance between chart 102 and image sensor 130. For example, optical system 120 under inspection can be inspected even in a case that the distance to the chart is infinity. In other words, the restriction by the distance to the chart can be reduced.

Further, in optical inspection device 100 in accordance with the present exemplary embodiment, not the peripheral light rays, but the on-axis light rays, which are the light rays along the center axis of collimator 103, are delivered to collimator 103. This makes it possible to deliver the light rays to the center of collimator 103, and not to deliver the light rays to the periphery of collimator 103. Accordingly, optical system 120 under inspection can be inspected without being affected by the distortion of the collimating lens provided in collimator 103. This makes it possible to improve the inspection accuracy of optical system 120 under inspection.

Modification Example

In the above-described exemplary embodiment, the focus bracketing is performed by moving image sensor 130 to change the distance between chart 102 and image sensor 130. In the present modification example, chart 102 is moved to change the distance to the chart.

Figure 10:
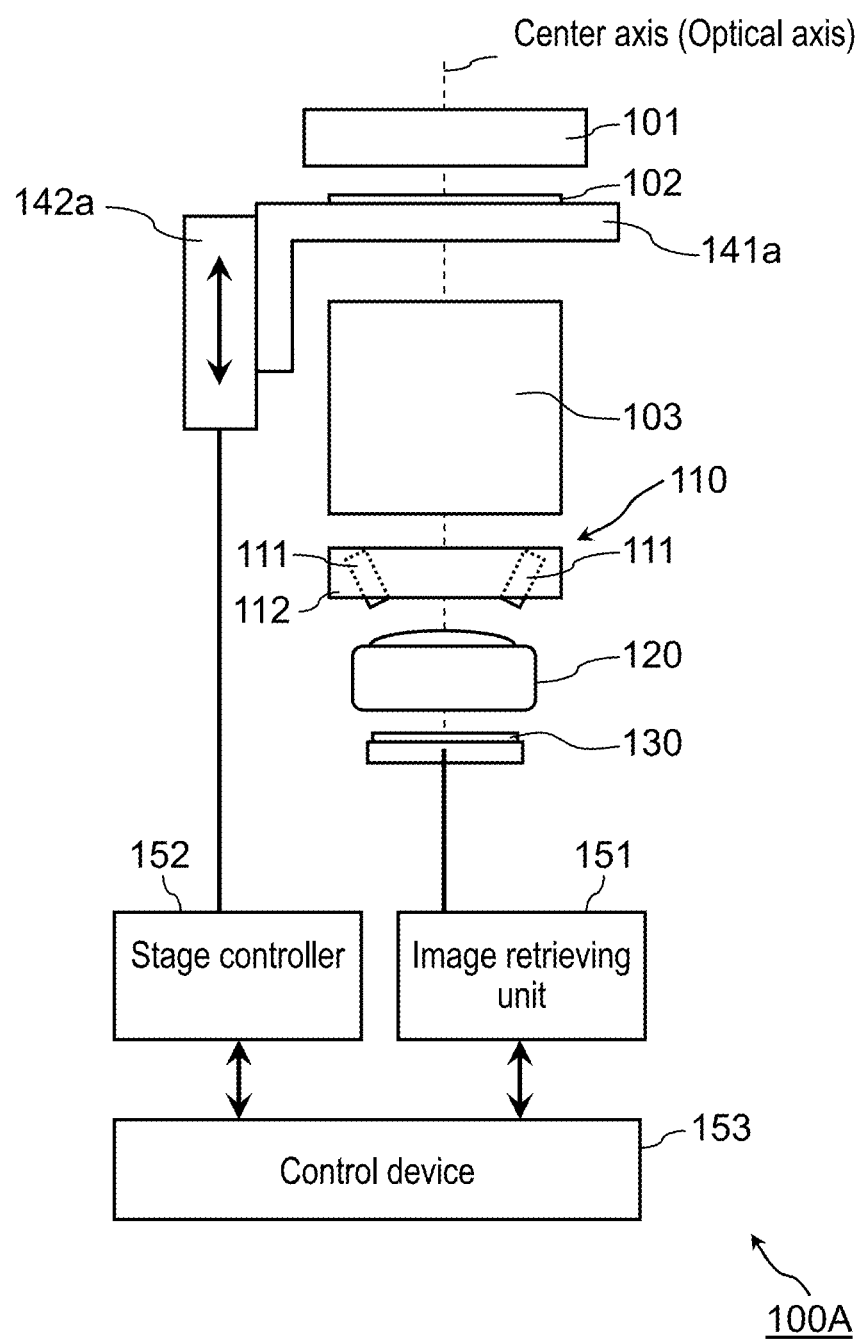
FIG. 10 is a diagram illustrating an entire configuration of an optical inspection device in accordance with a modification example of the exemplary embodiment.

FIG. 10 is a diagram illustrating an entire configuration of an optical inspection device in accordance with a modification example of the above-described exemplary embodiment.

Optical inspection device 100A in accordance with the present modification example comprises, similarly to optical inspection device 100 in accordance with the above-described exemplary embodiment, LED 101, chart 102, collimator 103, reflection unit 110, image retrieving unit 151, stage controller 152, and control device 153. Also, optical inspection device 100A in accordance with the present modification example includes stage 141a and stage driving mechanism 142a in place of stage 141 and stage driving mechanism 142 included in the above-described exemplary embodiment. Also, in accordance with the present modification example, optical inspection device 100A may not include image sensor 130. In a case where optical inspection device 100A does not include image sensor 130, image sensor 130 fixed to optical system 120 under inspection may be placed in optical inspection device 100A together with optical system 120 under inspection.

Stage 141a is a stage that is movable along the center axis of collimator 103 and supports chart 102. Chart 102 is placed on stage 141a so that pattern 102a drawn on chart 102 is disposed on the optical axis.

Stage driving mechanism 142a includes a motor, for example, and rotates the rotational axis of the motor according to a drive signal from stage controller 152. This allows stage 141a to move along the optical axis of optical system 120 under inspection. In other words, in a case where the direction of the optical axis is in the vertical direction, stage driving mechanism 142a moves stage 141a upward or downward in the vertical direction.

To perform the focus bracketing, control device 153 causes stage controller 152 to move stage 141a along the optical axis, while causing image retrieving unit 151 to repeatedly execute retrieval of captured images P.

With this operation, according to the present modification example, it is possible to easily perform the focus bracketing, and to rapidly perform inspection of optical performances of optical system 120 under inspection using the imaged results. Further, since the chart disposed on stage 141a moves, it is possible to easily perform the focus bracketing even in the condition that optical system 120 under inspection and image sensor 130 are fixed to each other. In other words, even in a case where optical system 120 under inspection is a lens barrel fixed to image sensor 130 (the so-called final product), it is possible to properly perform inspection of optical system 120 under inspection.

Other Exemplary Embodiments

In the above description, an exemplary embodiment and its modification example have been described as examples of techniques disclosed in the present application. However, the techniques in accordance with the present disclosure are not limited to the above-described exemplary embodiment and modification example, and may be applied to other exemplary embodiments in which modifications, substitutions, additions, and omissions are made. Also, the structural components described in the above exemplary embodiment and modification example may be appropriately combined to configure a new exemplary embodiment.

Therefore, other exemplary embodiments will hereinafter be described.

In the above-described exemplary embodiment and its modification example, each component such as, for example, image retrieving unit 151, stage controller 152 and control device 153, may be configured in a dedicated hardware, or may be implemented by executing a software program suitable for each component. Each component may be implemented in such a manner that a program execution unit such as, for example, a central processing unit (CPU) or a processor, reads out and executes a software program stored in a storage medium such as, for example, a hard disk or a semiconductor memory. Here, s software that implements the optical inspection devices in accordance with the above-described exemplary embodiment and its modification example is a program that causes a computer to execute each of the processing steps included in steps S120 to S170 shown in FIG. 9A or each of the steps included in the flowchart shown in FIG. 9B.

Also, in the above-described exemplary embodiment and its modification example, an optical inspection method and optical inspection devices for inspecting an optical system under inspection have been described with reference to some examples. Another aspect of the present disclosure may be a lens barrel production apparatus which has such a built-in module that inspects an optical system under inspection by using the optical inspection method. Specifically, this lens barrel production apparatus adjusts and fixes the relative positions of optical system 120 under inspection and image sensor 130 based on a one-sided blur, an optical axis deviation and a flange back, which are measured by using the optical inspection device.

Also, in the above-described exemplary embodiment and its modification example, the optical inspection device has four mirrors 111. However, the number of mirrors 111 provided in the optical inspection device may not be limited to four, and may be any number of one or more.

In the foregoing description, the optical inspection devices in one or more aspects of the present disclosure have been described based on the exemplary embodiment and its modification example. However, the present disclosure may not be limited to the exemplary embodiment and its modification example. It should be understood that the scope of the present disclosure may include those obtained by modifying the above-described exemplary embodiment and its modification example in various manners conceived by any person skilled in the art, and embodiments constituted by combining the components of the above-described exemplary embodiment and its modification example.

The present disclosure, which provides the advantageous effect of properly inspecting the optical performances of an optical system under inspection without being restricted by the distance to the chart, is applicable to a device that inspects lenses of, for example, cameras, vehicle cameras, cameras equipped in mobile phones or smartphones, or cameras equipped in door phones.

What is claimed is:

1. An optical inspection device for inspecting an optical performance of an optical system including at least one lens, the optical inspection device comprising:
    a light emitter;
    a chart on which a shape to be projected by the light emitter is drawn;
    a collimating lens disposed between the chart and the optical system under inspection; and
    a mirror disposed between the collimating lens and the optical system under inspection,
    wherein the light emitter irradiates the chart with light to deliver light rays to the collimating lens as on-axis light rays, and to project the shape on the chart onto a center of an image sensor through the collimating lens and the optical system under inspection, and wherein the mirror reflects light rays delivered to the mirror through the collimating lens among the on-axis light rays to project the reflected light rays onto a periphery of the image sensor through the optical system under inspection.

2. The optical inspection device according to claim 1, wherein the mirror is one of a plurality of mirrors, and wherein the plurality of the mirrors are arranged to be rotationally symmetrical around an axis which is substantially the same as a center axis of the collimating lens, and are each inclined with respect to the center axis at an angle depending on inspection of the optical system to be inspected.

3. The optical inspection device according to claim 2, wherein the optical inspection device is configured such that the optical system to be inspected is placed in the optical inspection device so that an optical axis of the optical system to be inspected coincides with the center axis of the collimating lens, and wherein, defining an incident angle of light necessary for inspection of the optical system under inspection as θ, each of the mirrors is inclined at θ/2 with respect to the center axis.

4. The optical inspection device according to claim 1, wherein the shape on the chart is substantially circular, and wherein an area around the shape on the chart is black.

5. The optical inspection device according to claim 1, further comprising a stage that is movable along the center axis of the collimating lens, and wherein the image sensor is placed on the stage.

6. The optical inspection device according to claim 1, further comprising a stage that is movable along the center axis of the collimating lens, and wherein the chart is placed on the stage.

7. A method of producing a lens of an optical system under inspection through inspection by an optical inspection device, the method comprising:

providing the optical inspection device configured to inspect an optical performance of the optical system under inspection including the lens, the optical inspection device having:

a light emitter;
a chart on which a shape to be projected by the light emitter is drawn;
a collimating lens disposed between the chart and the optical system under inspection; and
a mirror disposed between the collimating lens and the optical system under inspection, irradiating the chart with light from the light emitter to deliver light rays to the collimating lens as on-axis light rays, and projecting the shape on the chart onto a center of an image sensor through the collimating lens and the optical system under inspection;

reflecting light rays delivered to the mirror through the collimating lens among the on-axis light rays to project the reflected light rays onto a periphery of the image sensor through the optical system under inspection;

obtaining measurements of the lens of the optical system through said irradiating, said projecting, and said reflecting performed by the optical inspection device; and producing the lens based on the obtained measurements.

8. An optical inspection method for inspecting an optical system including at least one lens, wherein the method uses an optical inspection device including:

a light emitter;
a chart on which a shape to be projected by the light emitter is drawn;
a collimating lens disposed between the chart and the optical system under inspection; and
a mirror disposed between the collimating lens and the optical system under inspection, the method comprising:

irradiating the chart with light from the light emitter to deliver light rays to the collimating lens as on-axis light rays, and projecting the shape on the chart onto a center of an image sensor through the collimating lens and the optical system under inspection, and reflecting light rays delivered to the mirror through the collimating lens among the on-axis light rays to project the reflected light rays onto a periphery of the image sensor through the optical system under inspection.

* * * * *